US006807262B1

United States Patent
Goldman

(10) Patent No.: US 6,807,262 B1
(45) Date of Patent: Oct. 19, 2004

(54) CENTRAL OFFICE CONTROL OF RECEIVE AND TRANSMIT HANDSET VOLUME

(75) Inventor: Stuart O. Goldman, Scottsdale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 537 days.

(21) Appl. No.: 09/678,377

(22) Filed: Oct. 3, 2000

(51) Int. Cl.[7] .............................................. H04M 1/00
(52) U.S. Cl. ...................... 379/157; 379/156; 379/164; 379/165; 379/166; 379/387.01; 379/387.02; 379/390.01; 379/207.06; 379/201.12; 379/207.02; 379/393
(58) Field of Search ....................... 379/387.01–387.02, 379/347, 390.01, 207.06, 201.12, 207.02, 393, 156–157

(56) References Cited

U.S. PATENT DOCUMENTS

| | | | |
|---|---|---|---|
| 4,017,695 A | * | 4/1977 | Jaconetty et al. ........... 379/282 |
| 4,460,806 A | * | 7/1984 | Canniff et al. ............... 379/386 |
| 4,866,756 A | * | 9/1989 | Crane et al. .............. 379/88.01 |
| 5,195,132 A | | 3/1993 | Bowker et al. |
| 5,539,806 A | * | 7/1996 | Allen et al. .................... 379/52 |
| 5,651,053 A | * | 7/1997 | Mitchell ................. 379/210.02 |
| 5,802,164 A | | 9/1998 | Clancy et al. |
| 6,061,431 A | | 5/2000 | Knappe et al. |

* cited by examiner

Primary Examiner—Curtis Kuntz
Assistant Examiner—Alexander Jamal
(74) Attorney, Agent, or Firm—David J. Zwick; Steven R. Santema

(57) ABSTRACT

A switch based feature that allows subscribers to adjust their incoming or outgoing audio signal strength. The value of the transmit or receive pad values on the subscriber line card are adjusted to control the strength of the audio signal transmitted to, or received from, the network. The subscriber controls the feature by sending a hook flash to the switch, entering the DTMF keypad feature code and transmit or receive volume parameters, and then returning to the call.

10 Claims, 1 Drawing Sheet

US 6,807,262 B1

CENTRAL OFFICE CONTROL OF RECEIVE AND TRANSMIT HANDSET VOLUME

FIELD OF THE INVENTION

The present invention relates to controlling the handset volume of a telephone call, and more particularly to user control of the speech volume transmitted by the central office switch by adjusting the line card transmit and receive pad values.

BACKGROUND OF THE INVENTION

When using a telephone, there may be several reasons that a different handset audio volume level is desired. For example, a hearing impaired individual may require a higher volume in order to hear the conversation. The listener may be located in a noisy environment that interferes with his ability to hear the conversation. A poor connection may result in an attenuated signal. One or more off-hook extension telephones may attenuate the signal such that hearing the conversation is difficult for all of the parties. Also, the handset audio volume may need to be lowered if the received telephone signal is too strong, or the speaker is talking particularly loud.

There also may be a desire to control the mouthpiece volume on the outgoing signal of a telephone user. For example, an individual may speak at a low volume making it difficult for the listener to hear, and desire to increase the transmit volume of his handset. Also, a participant in a conference call may be in a noisy environment that is disrupting the conference call or even causing his line to inadvertently gain control of the call, and the participant desires to reduce the transmit volume of the handset.

Many telephones have volume and mute controls that let the listener control the handset audio volume. This solution requires purchasing a specially equipped phone. Another suggested solution to control the handset audio volume uses centrally located digital network transmission components, such as echo cancelers (U.S. Pat. No. 5,539,806), or digital signal processors found in encoding/decoding components (U.S. Pat. No. 6,061,431). Another suggested solution uses a separate control circuit that is added to a trunk circuit that allows a user of the trunk circuit to control the volume through DTMF tones (U.S. Pat. No. 4,017,695). This circuit requires the user to hold a DTMF key for more than one second to allow the control circuit to intercept the tone. This method interferes with other services the user may subscribe to that require the entry of keypad tones, and requires the addition of a separate control circuit for each trunk circuit.

SUMMARY OF THE INVENTION

It is an object of the present invention to provide a system that will allow a subscriber to control the audio volume of a telephone call that uses existing central office switch circuitry.

Another object of the present invention is to provide such a system such that it will not interfere with other services the subscriber may have.

The invention of Applicant is a switch based feature that allows subscribers to adjust their incoming or outgoing audio signal strength. The invention adjusts the value of the transmit pad or receive pad on the subscriber line card to adjust the strength of the audio signal transmitted to, or received from, the network. The subscriber controls the feature by first sending a switch-hook flash to the switch, entering the DTMF keypad feature code and transmit or receive volume parameter, and then returning to the call.

DESCRIPTION OF THE DRAWINGS

The FIGURE shows a block diagram of a preferred embodiment of the present invention.

DESCRIPTION OF THE PREFERRED EMBODIMENT

Figure 1:
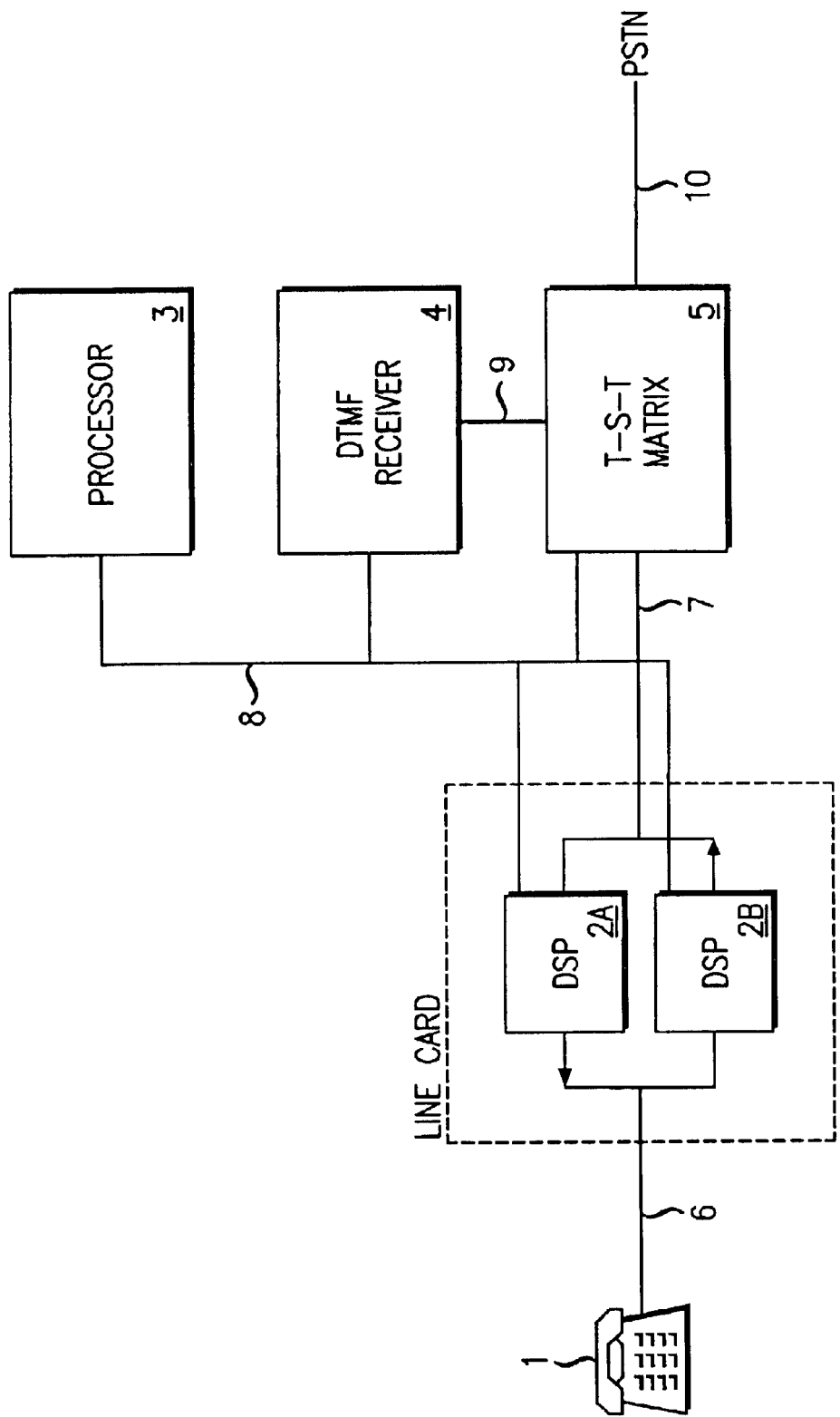

The FIGURE shows a block diagram of a preferred embodiment of the present invention. Digital signal processors 2A and 2B reside on a line card of a central office switch (CO), such as a GTD-5 (Registered Trademark of Verizon Communications) EAX Central Office Switch by AG Communication Systems, and perform functions associated with the transmit and receive paths, respectively, for a subscriber 1. DSPs 2A and 2B are coupled to subscriber 1 via subscriber loop 6, and are coupled to the time-space-time matrix 5 of the CO via connection 7. TST matrix 5 is coupled to the public switched telephone network (PSTN) over trunk connections 10. A DTMF receiver 4 is connected to TST matrix 5 over connection 9, and is used by the CO to collect digits when a call is initiated, or during a call when a switch feature is requested by a telephone user. A switch processor 3 controls the operation of DSPs 2A and 2B, TST matrix 5, and DTMF receiver 4 via control path 8.

Central office switches use pads to introduce attenuation into the analog portion of a telephone call to control echo on the line. Calls between stations separated by long distances experience a delay effect heard by the caller as an echo of the caller's voice. This effect can be corrected by inserting a small loss in the circuit. Almost all switches can be engineered to automatically insert loss into a line-to-line, trunk-to-line, or line-to-trunk connection using a digital pad. In the preferred embodiment, the GTD-5 pads are normally configured with 0 dB, 3 dB, 5 dB, and 6 dB values, however the GTD-5 is engineered with the capability to support a range of 20 digital pad values. Pad values are subtracted from the signal in a PCM format to arrive at the desired padded signal. A 0 dB loss pad value is engineered within a digital call path, i.e., a line or trunk having digital terminations at both ends, to ensure data integrity. Each line and trunk of the switch is assigned a digital pad value based primarily on the line or trunk length. For example, a trunk that connects to a switch that is at a great distance will be engineered with a higher pad value than a trunk that connects to a relatively close switch. In the preferred embodiment, line padding can be controlled during call processing by processor 3.

Many switch based features require that the user signal his desire to use a specific feature by first flashing the switch hook. The hook flash signals the switch to suspend the call currently in progress, and attach a receiver to the user line and provide a special dial tone to the user. The user can then enter DTMF tones from the telephone keypad to signal what feature is desired and the feature parameters as needed. The CO can then resume the call and release the DTMF receiver. Intercepting the flash hook allows isolation of the DTMF tones so that they are not heard by the other party nor interfere with certain online functions that the user may be performing, such as online banking.

In the preferred embodiment of the present invention, DSPs 2A and 2B, among other functions they perform, perform the line card digital pad functions associated with subscriber loop 6. These pad functions are controlled by processor 3 via control path 8. In support of the receive and transmit volume control feature of the present invention, DSPs 2A and 2B are separately engineered to support a range of pad values as required to make the feature operate effectively and as desired by the service provider. This allows the service provider to specify the number of pad values that the subscriber can increment or decrement, and to limit the range of amplification or attenuation that the subscriber may insert into the call to limit adverse affects (e.g., excessive echo, inability to hear anything, etc.).

In operation, the feature is invoked by subscriber 1 by sending a flash hook either during a call in progress, or after receiving dial tone but before entering any digits. The subscriber's line card detects the hook flash and signals processor 3 via control path 8. Processor 3 then suspends the call, attaches DTMF receiver 4 to user line 7 via TST matrix 5 and connection 9, and provides a special dial tone to subscriber 1. Subscriber 1 then enters digits via the DTMF keypad on the subscriber's telephone indicating the feature code for the receive and transmit volume control feature of the present invention, whether to change the transmit or receive volume, and whether to increase or decrease the volume. The feature and parameter digit strings are determined by the service provider. The entered digits are passed by DTMF receiver 4 to processor 3. Processor 3 interprets the digits and adjusts the DSP 2A or 2B pad values as indicated by the entered digits. Processor 3 then resumes the call and releases DTMF receiver 4 from the line. A subscriber can change the transmit or receive volume as often as needed during a call.

Since the feature is invoked by a flash hook and suspension of the call, entered digits are not heard by listeners at the far end. Also, since the feature takes advantage of the ability of the switch to control line card pad values through processor control, no special equipment is required to be added to the central office switch or the subscriber's telephone or line.

While a preferred embodiment of the receive and transmit volume control invention of Applicant has been particularly shown and described, it is not intended to be exhaustive nor limit the invention to the embodiment disclosed. It will be apparent to those skilled in the art that modifications to the present invention can be made without departing from the scope and spirit of the invention. For example, the control functions of processor 3 that control the pad values of DSPs 2A and 2B may be distributed among sub-processors of the switch. While a digital pad using DSPs 2A and 2B is shown, an analog pad having a sufficient number of pad values and allowing processor control during call processing may also be used. While a DTMF receiver 4 is shown, other receivers may be used, such as pulse receivers and IVR systems. In an ISDN environment, a D-channel signal processing function serves the same purpose as DTMF receiver 4 of the preferred embodiment, i.e., to collect the DTMF digits entered by the subscriber and pass this information to processor 3. It is intended that the scope of the invention be defined by the claims appended hereto and their equivalents.

What is claimed is:

1. A central office switch receive and transmit volume control system, comprising:
    a processor of the central office switch;
    transmit and receive pads of a line card, said pads engineered with a sufficient range of pad values, said pads capable of control by said processor during call processing;
    a receiver operable under control of said processor during a call to collect information supplied by a subscriber indicating a desired transmit or receive volume adjustment for a subscriber line associated with the call and pass said information to said processor;
    said processor operable to attach said receiver to the subscriber line, thereby enabling the receiver to collect said information indicating a desired transmit or receive volume adjustment, the processor operable after receiving said information to resume the call, release said receiver from the subscriber line and adjust said transmit or receive pads in accordance with said information passed by said receiver.

2. A central office switch receive and transmit volume control system according to claim 1, wherein said transmit and receive pads are digital.

3. A central office switch receive and transmit volume control system according to claim 1, wherein said transmit and receive pads are analog.

4. A central office switch receive and transmit volume control system according to claim 1, wherein said receiver is a DTMF receiver.

5. A central office switch receive and transmit volume control system according to claim 1, wherein said receiver is a pulse receiver.

6. A central office switch receive and transmit volume control system according to claim 1, wherein said receiver is an interactive voice response system.

7. A central office switch receive and transmit volume control system according to claim 1, wherein said receiver is an ISDN signal processing function.

8. A volume control system for one or more subscriber lines connected to a central office, comprising:
    a processor;
    a plurality of line cards, the line cards each including transmit and receive pads operable under control of the processor to adjust corresponding transmit or receive volume of an associated subscriber line;
    a DTMF receiver operable under control of the processor to collect DTMF tones issued by a subscriber and pass the DTMF tones to the processor;
    the processor operable responsive to a flash hook issued from the subscriber to suspend a call in progress, yielding a suspended call, the processor interpreting DTMF tones received during the suspended call as indicating a desired transmit or receive volume adjustment, the processor operable after receiving said DTMF tones to adjust said transmit or receive pads of the line cards in accordance with said DTMF tones passed by said receiver during the suspended call.

9. The volume control system according to claim 8, wherein said processor is operable after receiving said DTMF tones during the suspended call to resume the call, the processor interpreting DTMF tones during the call as invoking services other than volume control.

10. The volume control system according to claim 8, wherein said processor is operable to receive a flash hook from the subscriber during a call in progress or after the subscriber receives a dial tone but before the subscriber enters any digits.

* * * * *